United States Patent
Underwood et al.

(10) Patent No.: US 6,611,149 B1
(45) Date of Patent: Aug. 26, 2003

(54) CONDOM NIPPLE TESTING APPARATUS

(75) Inventors: Daniel Underwood, Albany, GA (US); Ken Thompson, Fitzgerald, GA (US)

(73) Assignee: Agri Dynamics, Inc., Albany, GA (US)

( * ) Notice: Subject to any disclaimer, the term of this patent is extended or adjusted under 35 U.S.C. 154(b) by 0 days.

(21) Appl. No.: 10/328,093

(22) Filed: Dec. 23, 2002

(51) Int. Cl.[7] .................................................. G01N 27/00

(52) U.S. Cl. ........................ 324/557; 702/34; 702/35; 702/57

(58) Field of Search ................ 29/235; 702/34, 702/35, 36, 57, 64, 108, 117, 183, FOR 103, FOR 104, FOR 106, FOR 124, FOR 125, FOR 134, FOR 170, FOR 171; 324/557, 558, 559; 73/38, 39, 40

(56) References Cited

U.S. PATENT DOCUMENTS

| | | | |
|---|---|---|---|
| 3,992,766 A | 11/1976 | Field | 29/235 |
| 5,196,799 A | 3/1993 | Beard et al. | 324/557 |
| 5,517,849 A | 5/1996 | Sisbarro et al. | 73/40 |
| 5,595,704 A | 1/1997 | Hayashi et al. | 264/404 |
| 5,824,882 A | 10/1998 | Griebel et al. | 73/38 |
| 6,160,406 A | 12/2000 | Underwood et al. | 324/558 |
| 6,164,122 A | 12/2000 | Sisbarro et al. | 73/45 |
| 6,318,154 B1 | 11/2001 | Povlacs et al. | 73/40 |

*Primary Examiner*—Jay Patidar
*Assistant Examiner*—Vincent Q. Nguyen
(74) *Attorney, Agent, or Firm*—Thomas C. Saitta

(57) ABSTRACT

A nipple testing apparatus for testing the nipple end of condoms mounted onto a mandrel, the apparatus having an electrically conducted nipple-shaped cavity connected in electrical circuit to the mandrel, such that electrical current passing through the condom disposed between the mandrel and the nipple cavity indicates a defect in the condom.

17 Claims, 7 Drawing Sheets

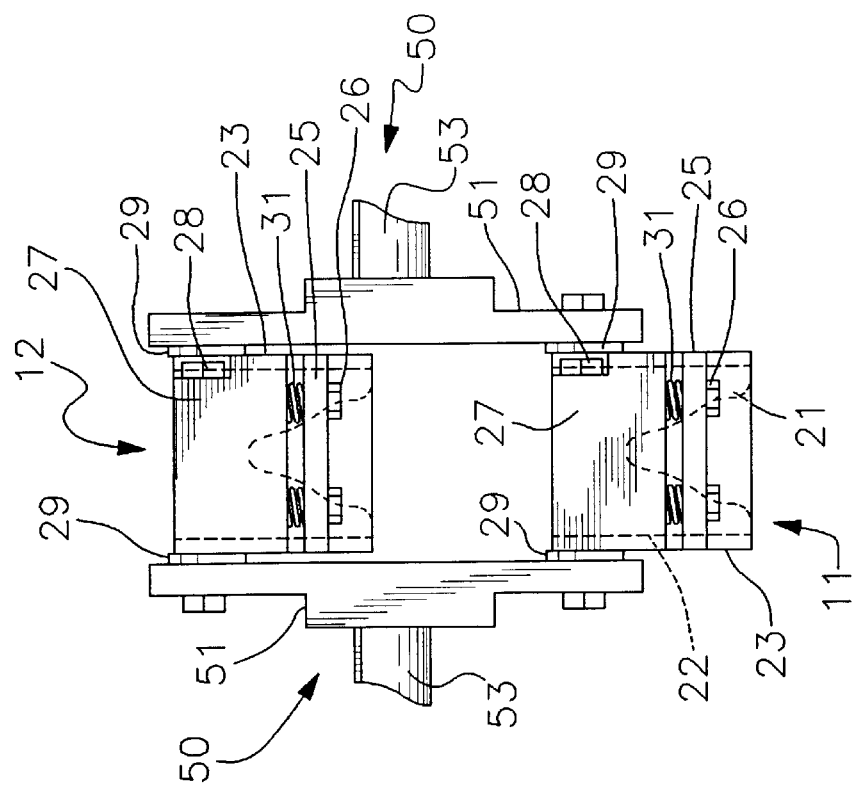
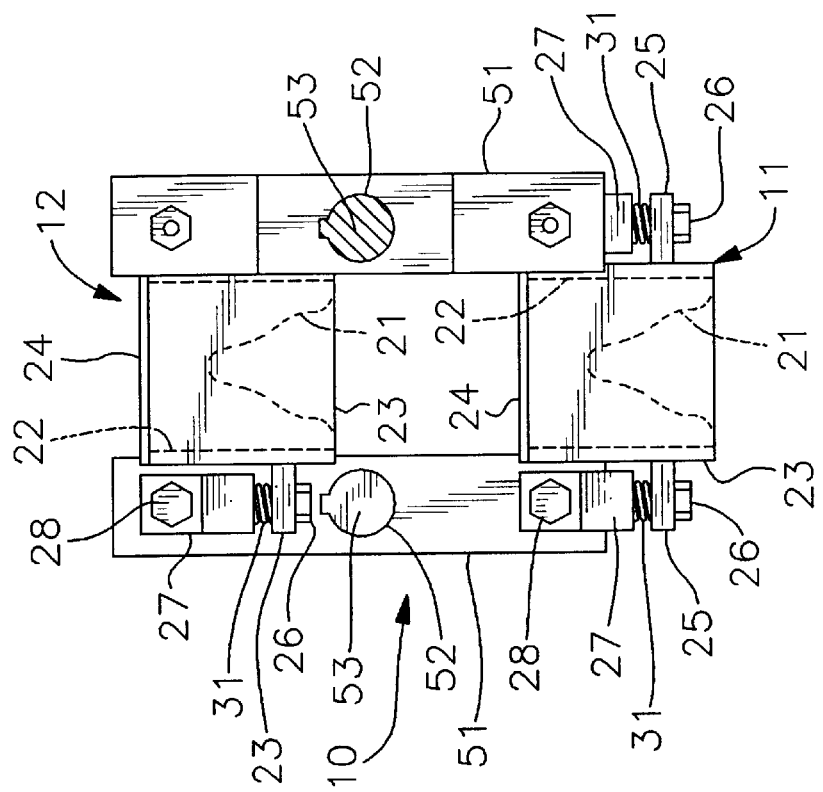

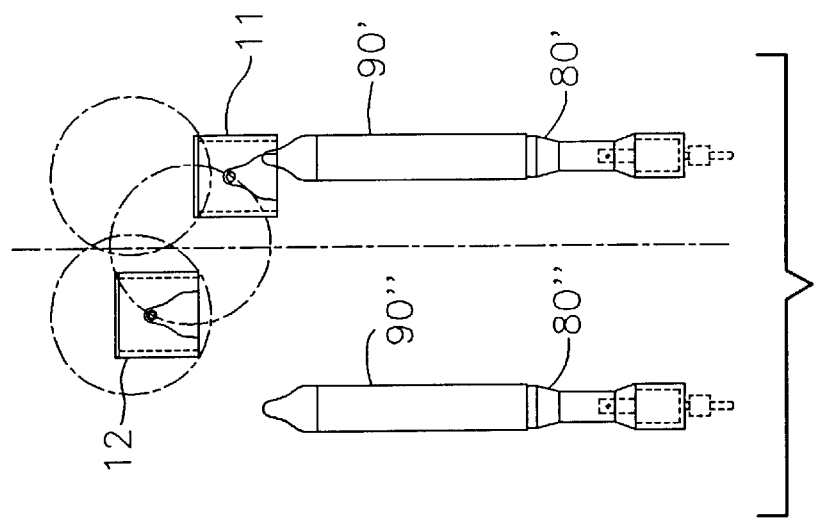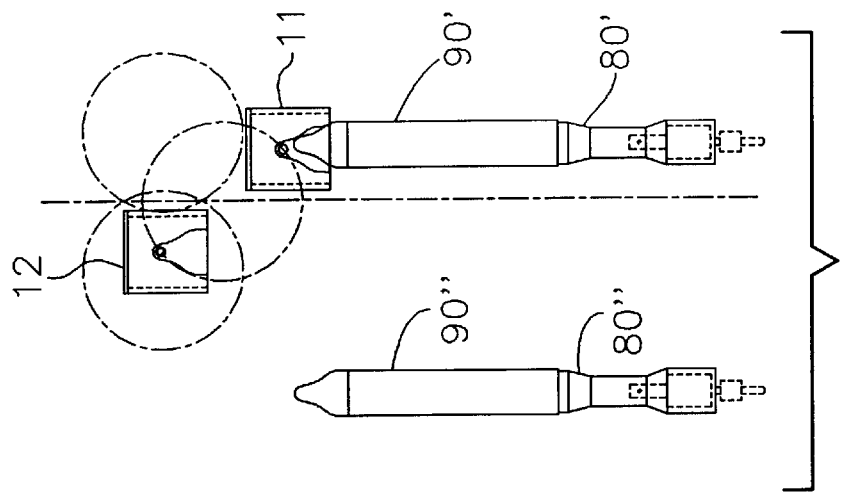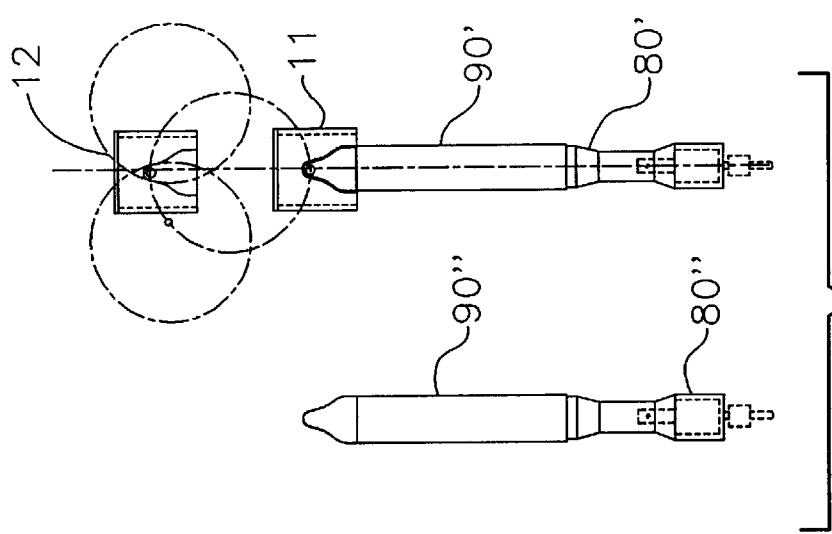

CONDOM NIPPLE TESTING APPARATUS

BACKGROUND OF THE INVENTION

The invention relates generally to the field of condom testing equipment for the detection of holes, imperfections and other defects, and more particularly to such equipment which is utilized to test the nipple of closed end portion of the condom. Even more particularly, the invention relates to such equipment which allows the condom nipples to be tested using electrical conductivity as mandrels containing the condoms move laterally past the testing equipment.

By virtue of their intended use, it is absolutely essential that condoms provide a complete and impermeable barrier. Minute holes undetectable under visual inspection and excessively thin spots in the condom wall likely to fail in use are unacceptable. Because the manufacturing process produces huge numbers of condoms at a high rate and because the material of construction is purposely very thin and elastic, there is always likely to be a relatively small number of defective products in any production run. Because of this, every condom must be tested prior to packaging and distribution for sale to insure that no defective condoms are supplied to consumers.

One technique for testing a condom involves placing the condom on an electrically conductive mandrel, immersing the condom in water containing an electrical lead and then attempting to pass a current through the water to the mandrel. The condom material acts as an insulating barrier between the water and the mandrel to prevent completion of the electrical circuit, but any hole in the condom will allow the circuit to be completed, indicating that the condom is defective. Advantages of this technique are that low electrical voltages are required and the use of water as a conductive medium provides full contact to all portions of the condom. The major drawback to this technique is that the condoms must be dried prior to packaging. Another drawback is that the technique does not provide an indication of excessively thin spots in the condom wall which may tear in use, since the thin material is still sufficient to prevent passage of current from the water to the mandrel.

Another known testing technique is to attempt to pass a gas through the condom. This technique also fails to indicate excessively thin areas in the condom wall.

Another known testing technique is to replace the conductive water with a conductive mesh material, the mesh being constructed so as to be very non-rigid so that it closely drapes against the condom on the conductive mandrel. The mandrel and condom are rotated while contacting the electrified mesh, and again any defects will allow the current to pass through the condom to the mandrel. A problem with this technique is that because the mesh must have a large amount of open area to achieve the desired flexibility, direct contact against every portion of the condom is not achieved, so a relatively high and thus dangerous amount of electrical current must be used—typically greater than 50 watts—to try to insure that the current will arc from the mandrel through a defect to the nearest piece of mesh. The variation in distance from the condom to particular points on the mesh as the condom is moved past the mesh also makes proper calibration of the electrical current difficult. Another problem is caused by the nipple portion of the condom. Because of this change in configuration from the generally cylindrical main body portion of the condom, providing enough contact between the mesh and the nipple material is problematic and defects can be missed.

A third and much improved technique is disclosed in U.S. Pat. No. 6,160,406, issued Dec. 12, 2000, to Underwood et al., in which a condom testing apparatus utilizing an arcing electrical current to detect holes and excessively thin wall areas in a condom mounted on a conductive testing mandrel is described, where the condom is passed across a conductive fabric member to test the main body and transition portion of the condom, and is passed through the bristles of a conductive brush member to test the nipple end of the condom. In alternative embodiments, the apparatus may utilize only conductive fabric or only conductive brushes.

It is an object of this invention to provide a highly efficient and accurate condom testing apparatus for the nipple area of a condom to detect any and every defect in the forward end of the condom, including a defect consisting of an excessively thin wall portion which may fail during use, without requiring excessive preparation or post-testing steps in the testing process. It is a further object to provide such an apparatus wherein the testing is performed rapidly such that the processing time for each condom is extremely short. It is a further object to provide such an apparatus wherein the condoms are tested while disposed on test mandrels which pass rapidly through the testing area. These objects, as well as other objects which will be apparent from the description to follow, are accomplished preferably by providing an apparatus having multiple nipple testing housings each having concave nipple-receiving cavities, with the housings mounted onto a rotating mechanism such that the cavities are brought into contact with the nipples of condoms mounted onto mandrels which pass laterally in rapid manner. Preferably, any defects in the condom nipples are detected by electrical arcing which occurs between the electrically conductive mandrels and the electrically conductive nipple-receiving cavities.

SUMMARY OF THE INVENTION

In general the invention comprises a condom testing apparatus which has means to transport a condom loaded onto an electrically conductive testing mandrel to bring the condom nipple portion into contact with electrically conductive nipple testing means comprising a nipple-shaped cavity, with the mandrel and nipple testing means connected in a gapped electrical circuit such that the condom acts as an electrical insulator to prevent completion of a circuit between the components of the testing equipment, but where the electrical current will arc between or through any defect in the condom nipple, such as a hole or excessively thin area in the condom wall, to complete the circuit, thus providing an indication that the condom is defective. The mandrel is shaped to correspond to the condom shape, including in particular the forward nipple portion. The nipple-shaped cavity is correspondingly shaped such that the gap between the mandrel nipple and the cavity wall is relatively uniform and minimal, being sized for optimum detection without excessively contacting the condom material such that detrimental friction effects may result. Preferably, the nipple-shaped cavity is formed of a compressible, conductive foam material.

Preferably, two or more nipple testing housings, each comprising a nipple-shaped receiving cavity, are mounted onto rotation means such that each housing moves in a circular arc between an engaged testing position and a non-engaged neutral position, such that the housings align with alternate mandrels as the mandrels are linearly moved past the testing location. The housings are connected by a pair of linking bars, and each bar has a separate pivot point, such that when the linking bars are rotated the housings move over a circular path with the cavity openings always facing in the same direction. The rotation of the housings is synchronized with the lateral movement of the mandrels, such that each nipple-testing cavity is advanced toward and removed from the mandrel without need for slowing the lateral movement of the mandrels.

BRIEF DESCRIPTION OF THE DRAWINGS

FIG. 3 is a front view of the nipple testing apparatus in the engaged testing position.

FIG. 4 is a side view of the nipple testing apparatus in the engaged testing position.

FIG. 9 is a front view showing the nipple testing apparatus with the first nipple testing housing in the engaged testing position for a first mandrel.

FIG. 10 is a front view showing the nipple testing apparatus after a small amount of lateral travel by the two mandrels.

FIG. 11 is a front view showing the nipple testing apparatus after a further amount of lateral travel by the two mandrels.

DETAILED DESCRIPTION OF THE INVENTION

With reference to the drawings, the invention will now be described in detail with regard for the best mode and the preferred embodiment. In general, the invention is an apparatus for testing condoms for defects, including holes and excessively thin wall areas, prior to packaging and distribution. The apparatus is preferably part of condom handling equipment having a mandrel to receive a condom in the unrolled condition, means to apply the condom to the mandrel prior to testing and means to remove the condom from the mandrel after testing, whether manually or mechanically, and means to transport the loaded mandrel through the condom testing apparatus as described. Such condom handling equipment is well known in the industry, and a representative example may be seen in U.S. Pat. No. 5,499,898 issued to Vonier et al., the disclosure of which is incorporated herein by reference for purposes of illustrating such a condom testing apparatus where loaded mandrels are moved past and through various processing, treatment or testing stations. The mandrels are connected to transport mechanisms which move the mandrel laterally relative to the longitudinal axis, with the mandrels being fixed, rotatable by power means or freely rotatable dependent on the particular individual operation required to be performed. In a typical representative system, the mandrels are spaced laterally nine inches on center, and a mandrel passes a given point every one third second.

A condom 90 is composed of a thin, elastic material, typically a latex rubber, and is configured to have a generally cylindrical or tubular, open-ended, main body portion, a transition portion where the diameter of the condom 90 is reduced—rapidly at first, then minimally for a short distance along the longitudinal axis, and finally rapidly again—to form a closed nipple end. The condom 90 material of construction is an electrical insulator, in that an electrical current at a level below the insulating threshold will not pass through the condom wall. For packaging, the main body portion of the condom 90 is rolled along the central axis toward the nipple end. The testing mandrel 80 consists of a generally cylindrical body which is shaped to correspond to the overall shape of the condom 90, having a generally cylindrical main body, a transition region and reduced diameter end to define a nipple end. The mandrel 80 is composed of an electrically conductive material, preferably a metal, and is connected to an electrical circuit testing means 100. Electrical circuit testing means 100 may comprise any known system or apparatus where the completion of an electrical circuit may be sensed. The mandrel 80 is connected to a mandrel transport means capable of moving the mandrel 80 laterally past the condom nipple testing apparatus 10 for testing, the transport means being of any type suitable for a moving the mandrel 80 in the necessary direction.

Figure 16:
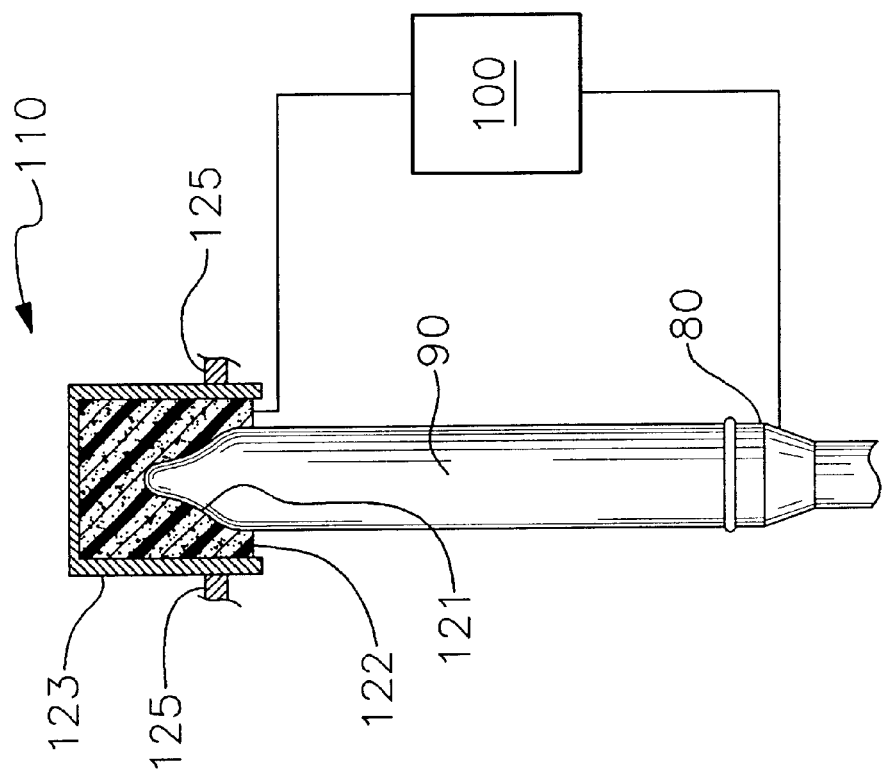
FIG. 16 is a view of a basic embodiment of the invention shown in the testing configuration, wherein the nipple testing housing is shown in cross-section and the electrical circuit testing means is shown schematically.

In the simplest embodiment, as illustrated in FIG. 16, the nipple testing apparatus 110 comprises a casing member 123 which retains an electrically conductive insert member 122, which may be composed of a metal but is preferably composed of an electrically conductive, compressible, expanded polymer foam, having a nipple-shaped cavity 121 that generally corresponds in size and configuration to the size and configuration of the nipple portion of a condom 90 mounted onto a mandrel 80. Use of a compressible foam reduces friction effects when the condom 90 is encountered, thereby reducing the likelihood of damaging the condom 90 during testing. Mounting flange members 125 or equivalent means are provided to mount the nipple testing apparatus 110 to a means to reciprocate, translate or rotate the nipple testing apparatus 110 relative to the condom 90 and mandrel 80, such that the nipple testing apparatus 110 can be disposed onto the end of the condom 90 during a testing operation, wherein the mandrel 80 and the electrically conductive insert member 122 of the nipple testing housing 110 are connected in electrical circuit in well known manner to electrical circuit testing means 100 such that any current passing between the mandrel 80 and the nipple testing apparatus 110, i.e., any current passing through the condom 90, is detected by electrical circuit detection means 100, thereby indicating a defect in the condom 90 consisting of a hole, a tear or an excessively thin wall portion. Alternatively, the nipple testing apparatus 110 can be mounted in a fixed manner with the mandrel 80 and condom 90 advanced into and out of the conductive nipple cavity 121.

Figure 2:
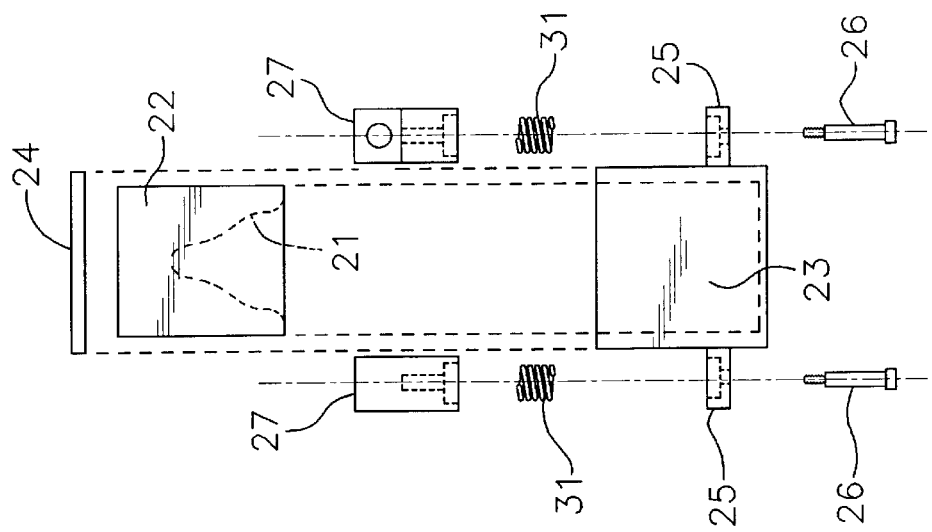
FIG. 2 is an exploded front view of a nipple testing housing.
Figure 1:
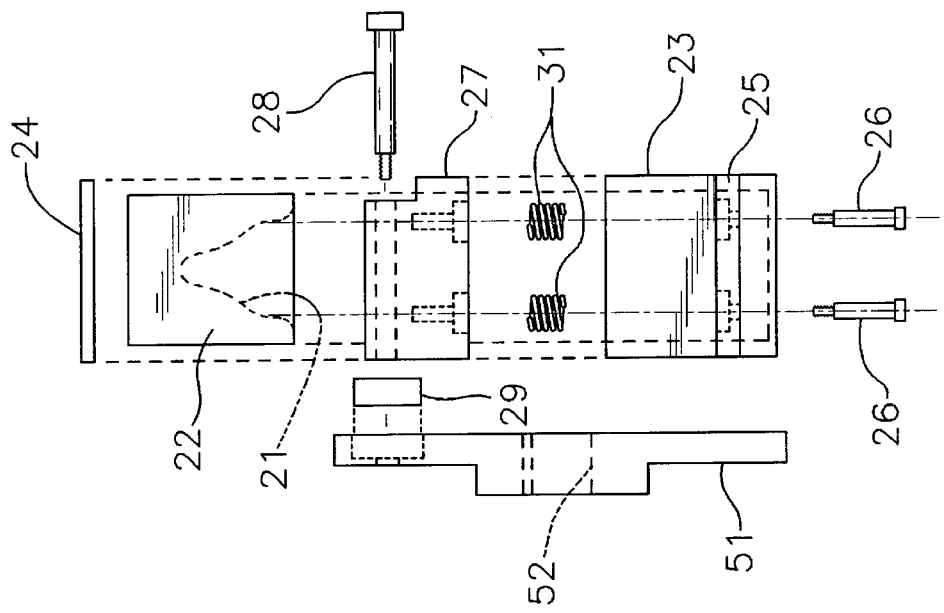
FIG. 1 is an exploded side view of a nipple testing housing.

In the more preferred embodiment, the nipple testing apparatus 10 comprises a first nipple testing housing 11 and a second nipple testing housing 12, both mounted onto rotation means 50 such that each nipple testing housing 11 and 12 is passed through space over a circular path. The first nipple testing housing 11 and the second nipple testing housing 12 are preferably identical in construction. As illustrated in FIGS. 1 and 2, first nipple testing housing 11 comprises in general a conductive nipple cavity 21 that is configured to correspond to the nipple end of the mandrel 80 when the mandrel 80 is loaded with a condom 90. The conductive nipple cavity 21 may be formed from metal, but is preferably formed as a compressible, conductive foam insert member 22 that is inserted into a cavity within a casing member 23 and retained by a top plate member 24. The casing member 23 is provided with a pair of mounting flange members 25 that are each apertured to receive a pair of shoulder bolts 26 to connect the mounting flanges 25 to a pair of pivot block members 27. Spring members 31 are disposed on the shoulder bolts 26 between the mounting flanges 25 and the pivot blocks 27, preferably retained in spring recesses provided in the mounting flanges 25 and the pivot blocks 27, to allow for relative movement of the casing member 23 and pivot block members 27. The spring members 31 reduce the likelihood of damage to the condom 90 as the nipple cavity 21 is advanced into the testing position, since spring members 31 allow the nipple cavity 21 move relative to the mandrel 80 should excessive force be encountered due to misalignment or the like. The pivot blocks 27 are each pivotally connected to a pair of pivot bar members 51 in a manner which allows the pivot blocks 27 and therefore the nipple cavity 21 to remain in a fixed orientation during rotation of the pivot bar members 51, i.e., the nipple cavity 21 will allows be oriented or face toward the mandrel 80. As shown, the pivot blocks 27 are provided with bores to receive pivot shoulder bolts 28 that are connected to the apertured ends of pivot bars 51. Preferably bearing members 29 are disposed between the pivot bars 51 and the pivot blocks 27. The two pivot blocks 27 face in opposite directions, such that the first nipple testing housing 11 is connected to the pivot bars 51 with one pivot bar 51 on front and the other pivot bar 51 on the rear of the nipple testing housing 11.

Pivot bars 51 each comprise a centrally located pivot bore 52 which receives a rotating shaft 53, which is rotated by suitable power means in known manner. The shafts 53 extend from the pivot bars 51 in opposite directions and are in parallel alignment with different central axes.

Figure 5:
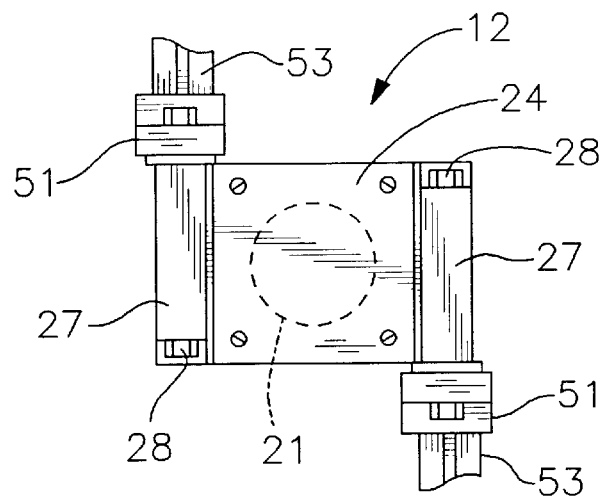
FIG. 5 is a top view of the nipple testing apparatus in the engaged testing position.
Figure 6:
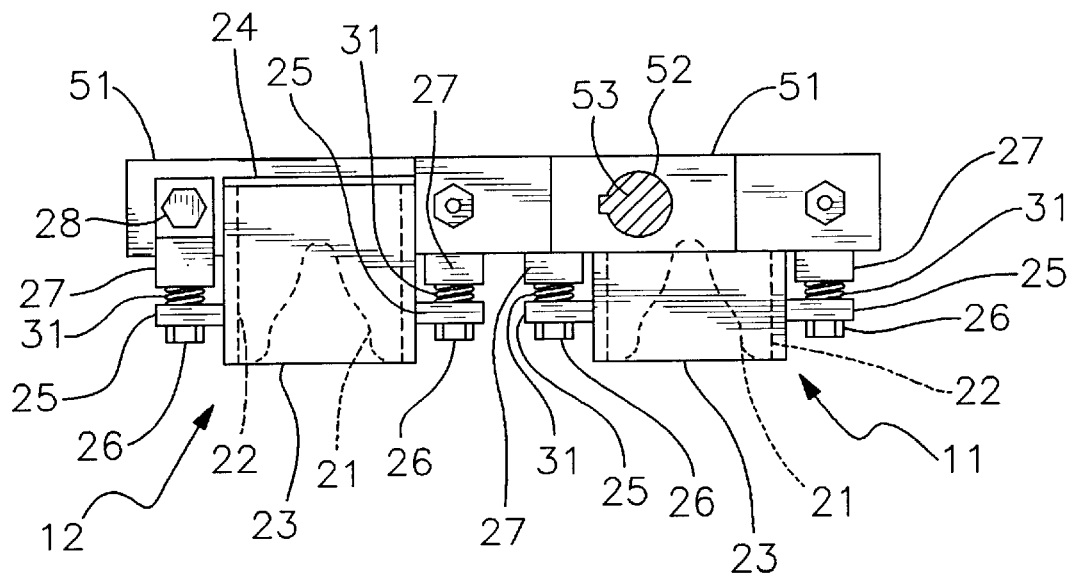
FIG. 6 is a front view of the nipple testing apparatus in a non-engaged position.
Figure 7:
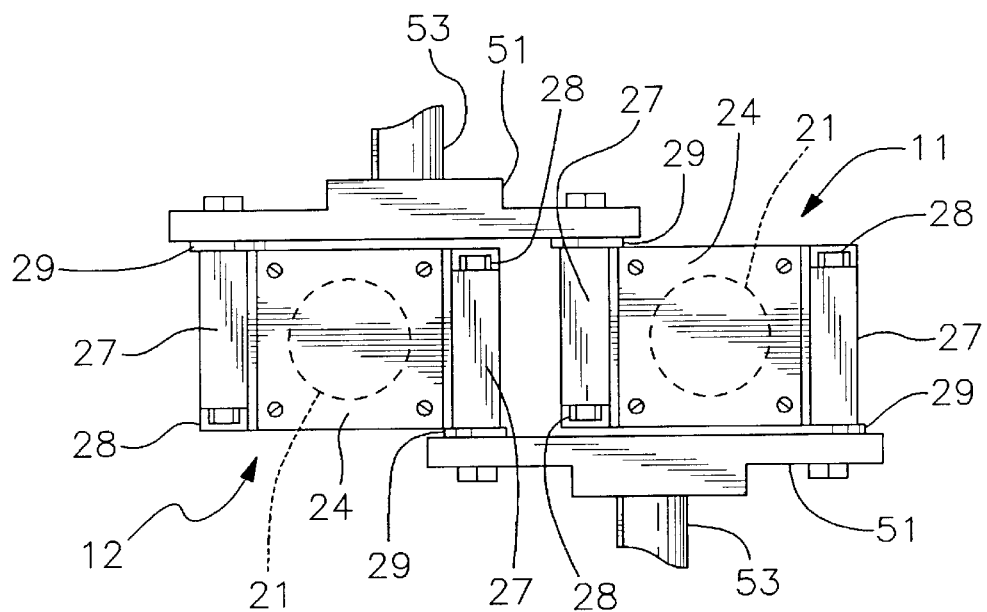
FIG. 7 is a side view of the nipple testing apparatus in a non-engaged position.
Figure 8:
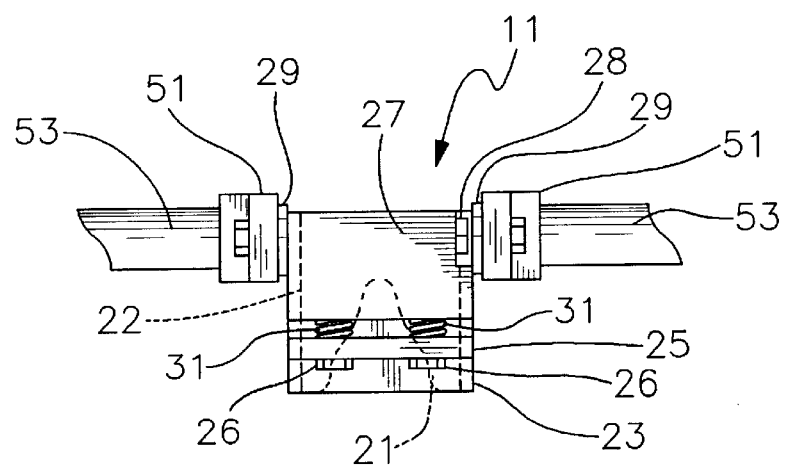
FIG. 8 is a top view of the nipple testing apparatus in a non-engaged position.

The second nipple testing housing 12 is constructed in the same manner and is mounted to the pair of pivot bars 51 in the same manner as the first nipple testing housing 11, such that one of the pivot bars 51 is to the front of both the nipple testing housings 11 and 12 while the other pivot bar 51 is to the rear of both, as illustrated in FIGS. 3 through 8. With this construction, both the nipple testing housings 11 and 12 always remain oriented in the same direction as the pivot bars 51 are rotated over 360 degrees—FIGS. 3 through 5 showing the nipple testing apparatus 10 in the engaged testing position and FIGS. 6 through 8 showing the nipple testing apparatus 10 in a non-engaged position as rotated 90 degrees. The first and second nipple cavities 21 will rotate about a central axis as shown in the figures.

It is to be understood that, while the invention is illustrated with a pair of nipple testing housings 11 and 12, the invention may also comprise any other number of nipple housings symmetrically disposed, where for example the pivot bar member 51 is configured in a Y-shape, a cross-shape, or formed as a circular or annular member. The use of two nipple testing housings 11 and 12 is preferred in that the disposition of two such housings allows for a neutral position, as illustrated in FIGS. 6 through 8, where neither housing 11 or 12 resides in the path of travel of mandrels 80. This neutral position wherein the housings 11 and 12 are retracted enables the carriage containing the mandrels 80 to be rapidly reversed for subsequent loading, testing and removal cycles.

Figure 14:
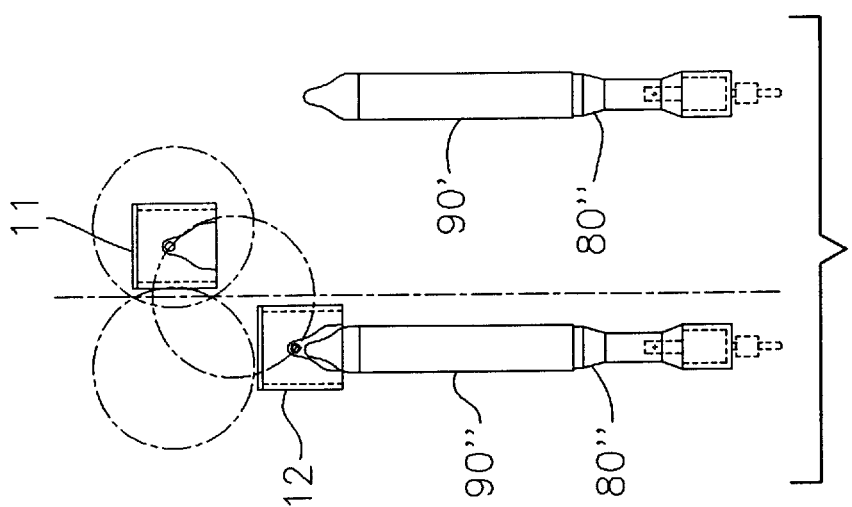
FIG. 14 is a front view showing the nipple testing apparatus after further lateral travel by the two mandrels, wherein the second nipple testing housing is beginning to receive the second mandrel.
Figure 13:
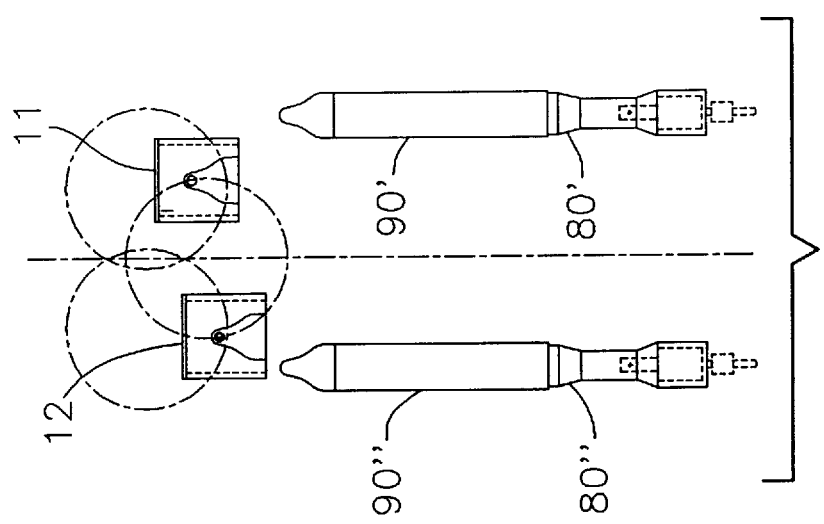
FIG. 13 is a front view showing the nipple testing apparatus after further lateral travel by the two mandrels, wherein the second nipple housing is nearing the second mandrel.
Figure 12:
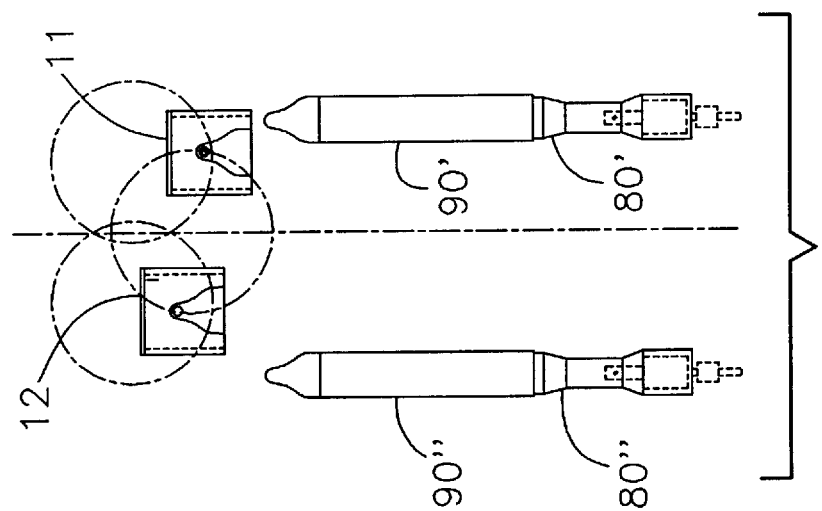
FIG. 12 is a front view showing the nipple testing apparatus after further lateral travel by the two mandrels, wherein the first nipple testing housing has separated from the first mandrel.
Figure 15:
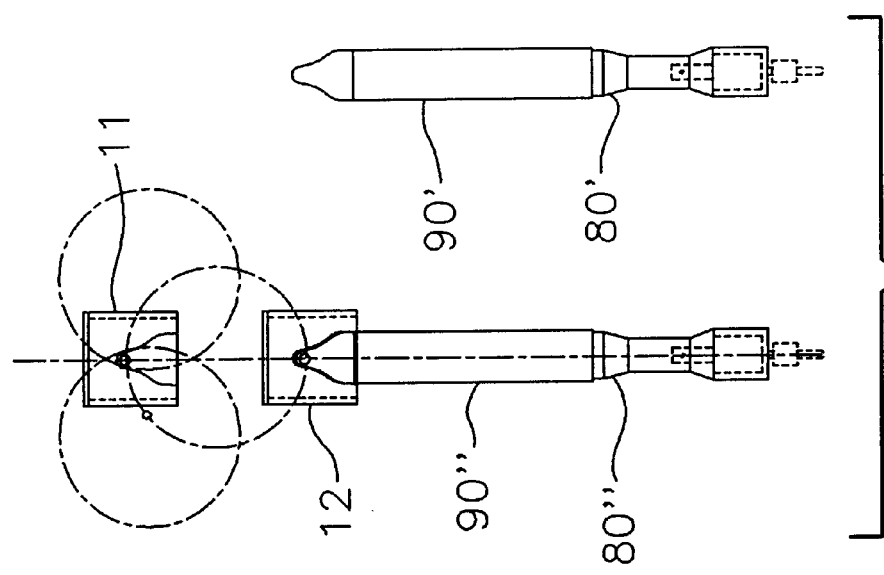
FIG. 15 is a front view showing the nipple testing apparatus after further lateral travel by the two mandrels, wherein the second nipple testing housing is now in the engaged testing position with the second mandrel.

Operation of the apparatus is illustrated by FIGS. 9 through 15, where successive positions are shown during the lateral movement of mandrels 80' and 80". In FIG. 9, the first mandrel 80' bearing a condom 90 is in the testing location with first nipple testing housing 11 mated with mandrel 80'. The mandrels 80 are connected in an electrical circuit in known manner to the nipple testing housings 11 and 12, such that any defect in the condoms 90 will allow a circuit to be completed, thereby indicating a defective condom 90. The nipple testing housings 11 and 12 are oriented as shown in FIGS. 3 through 5. As shown in the drawings, the mandrels 80' and 80" are separated by nine inches, but this distance may vary depending on the equipment used. FIG. 10 shows the mandrels 80' and 80" advanced two linear inches. As this has occurred, the rotation means 50 has rotated the nipple testing housings 11 and 12 as shown, such that first nipple testing housing 11 begins to retract from mandrel 80' while second nipple testing housing 12 begins to approach the trailing mandrel 80". In FIG. 1 the leading mandrel 80' has now advanced three inches from the testing position, and the rotation of nipple testing housings 11 and 12 has advanced. In FIG. 12, the lead mandrel 80' is now shown as advanced four inches from the testing position, and the first nipple testing housing 11 is now retracted completely from the travel pathway of mandrel 80'. In FIG. 13, the lead mandrel 80' has advanced five inches and the trailing mandrel 80" begins to near the testing position. The second nipple testing housing 12 has now passed below horizontal. In FIG. 14, the mandrels have advanced seven inches, and the rotation of the second nipple testing housing 12 begins to receive the mandrel 80" within the testing cavity 21. In FIG. 15, the mandrels 80' and 80" have advanced nine inches, such that mandrel 80" is now mated with second nipple testing housing 12 such that testing of the condom 90 on the trailing mandrel 80" is initiated.

Because the nipple testing housings 11 and 12 are mounted on rotation means 50 in precise alignment and indexed to the transverse separation distances of the mandrels 80, there is minimal contact between the nipple cavity 21 and the condom 90 except in the testing location, thereby reducing friction effects which can damage the condoms 90. In addition to the precise alignment and the approach path for the nipple testing housings 11 and 12, the provision of spring members 31 on the nipple testing housings 11 and 12 allows the casing member 23 and the conductive nipple cavity 21 to be biased away from the condom 90 if excessive contact occurs, such that the potentially damaging friction resulting from the contact is minimized. At a travel rate of ⅓ seconds between mandrels 80, the nipple cavity 21 will be mated with the mandrel 80 for about 40 milliseconds, during which time the nipple portion of the condom 90 is tested electrically for defects.

It is contemplated that equivalents and substitutions for certain elements and components set forth above may be obvious to those skilled in the art, and thus the true scope and definition of the invention is to be as set forth in the following claims.

We claim:

1. A condom nipple testing apparatus for testing the nipple end of a condom for defects, said apparatus comprising:

an electrically conductive mandrel having a nipple-shaped end and adapted to receive a condom thereon for testing;

an electrically conductive insert member having a nipple-shaped cavity corresponding to said nipple-shaped end of said mandrel, said insert member and said mandrel being connected in electrical circuit; and electrical circuit testing means for detecting the passage of electrical current between said mandrel and said insert member.

2. The apparatus of claim 1, wherein said insert member is composed of a polymer foam.

3. The apparatus of claim 1, wherein said insert member is composed of a metal.

4. The apparatus of claim 1, further comprising a casing member retaining said insert member, and wherein said casing member is movable relative to said mandrel.

5. A condom nipple testing apparatus for detecting defects in the nipple ends of condoms mounted onto electrically conductive mandrels having nipple-shaped ends, said apparatus comprising:

plural electrically conductive mandrels having nipple-shaped ends and each adapted to receive a condom thereon for testing;

a first electrically conductive nipple cavity and a second electrically conductive nipple cavity mounted onto a pair of parallel rotating shafts, each said nipple cavity corresponding in shape to said nipple-shaped ends of said mandrels, said first and second nipple cavities and said mandrels being connected in electrical circuit; and electrical circuit testing means for detecting the passage of electrical current between said mandrels and said first and second nipple cavities.

6. The apparatus of claim 5, wherein said first and second nipple cavities each comprise a compressible polymer foam insert member.

7. The apparatus of claim 5, wherein said first and second nipple cavities are composed of a metal.

8. The apparatus of claim 6, further comprising casing members retaining said insert members, and wherein said casing members are movable relative to said mandrels.

9. The apparatus of claim 8, further comprising a pair of pivot bar members, wherein said casing members are pivotally connected to said pivot bar members and said pivot bar members are connected to said rotating shafts.

10. The apparatus of claim 9, wherein said first and second nipple cavities rotate in a circular manner such that said first and second nipple cavities remain oriented in the same direction during rotation.

11. The apparatus of claim 9, wherein said mandrels are moved laterally.

12. The apparatus of claim 9, further comprising spring members disposed between said casing members and said pivot bar members.

13. A condom nipple testing apparatus for detecting defects in the nipple ends of condoms mounted onto electrically conductive mandrels having a nipple-shaped end, said apparatus comprising:

a first electrically conductive nipple-shaped cavity adapted to receive the nipple end of a condom mounted onto an electrically conductive mandrel;

a second electrically conductive nipple-shaped cavity adapted to receive the nipple end of a condom mounted onto an electrically conductive mandrel;

a first electrically conductive mandrel and a second electrically conductive mandrel, each having a nipple-shaped end and adapted to receive a condom thereon, wherein said first mandrel is connected in electrical circuit to said first nipple-shaped cavity and said second mandrel is connected in electrical circuit to said second nipple-shaped cavity;

electrical circuit testing means for detecting the passage of electrical current between said first mandrel and said first nipple cavity and between said second mandrel and said second nipple cavity.

14. The apparatus of claim 13, wherein said first and second mandrels travel laterally relative to said first and second nipple-shaped cavities and wherein said first and second nipple-shaped cavities each move in a circular path.

15. The apparatus of claim 14, further comprising a pair of parallel rotating shafts, wherein said first and second nipple-shaped cavities are mounted to said rotating shafts, such that said first and second nipple-shaped cavities remain oriented in the same direction during movement through said circular path.

16. The apparatus of claim 15, further comprising a pair of pivot bar members, wherein each of said first and second nipple-shaped cavities is mounted to both said pivot bar members.

17. The apparatus of claim 16, wherein said first and second nipple-shaped cavities are composed of a compressible, polymer foam.

* * * * *